(12) United States Patent
O'Neill

(10) Patent No.: US 9,205,352 B2
(45) Date of Patent: Dec. 8, 2015

(54) APPARATUS FOR TREATING WASTE WATER

(71) Applicant: James O'Neill, County Down (GB)

(72) Inventor: James O'Neill, County Down (GB)

( * ) Notice: Subject to any disclaimer, the term of this patent is extended or adjusted under 35 U.S.C. 154(b) by 249 days.

(21) Appl. No.: 13/984,691

(22) PCT Filed: Oct. 29, 2012

(86) PCT No.: PCT/EP2012/071357
§ 371 (c)(1),
(2) Date: Sep. 17, 2013

(87) PCT Pub. No.: WO2013/083330
PCT Pub. Date: Jun. 13, 2013

(65) Prior Publication Data
US 2014/0083955 A1    Mar. 27, 2014

(30) Foreign Application Priority Data
Dec. 8, 2011 (GB) .................................. 1121083.8

(51) Int. Cl.
*B01D 17/028* (2006.01)
*B01D 21/02* (2006.01)
(Continued)

(52) U.S. Cl.
CPC ........ *B01D 21/0042* (2013.01); *B01D 17/0211* (2013.01); *B01D 21/2438* (2013.01); *B01D 21/2461* (2013.01); *B01D 21/2488* (2013.01); *C02F 1/40* (2013.01); *E03F 5/16* (2013.01)

(58) Field of Classification Search
CPC ........... B01D 17/0211; B01D 17/0214; B01D 21/0042; B01D 21/2433; B01D 21/2461; B01D 21/2488; E03F 5/16; C02F 1/40
USPC .............. 210/801, 805, 194, 521, 523, 532.1, 210/538, 540
See application file for complete search history.

(56) References Cited

U.S. PATENT DOCUMENTS 2,491,912 A * 12/1949 Walker .......................... 210/523
2,782,929 A *  2/1957 Colket .......................... 210/540
(Continued)

FOREIGN PATENT DOCUMENTS

EP         0282906 A2    9/1988

OTHER PUBLICATIONS

International Search Report and Written Opinion of the International Searching Authority from corresponding Patent Cooperation Treaty (PCT) Application No. PCT/EP2012/071357, mailed Feb. 6 2013.

*Primary Examiner* — Christopher Upton
(74) *Attorney, Agent, or Firm* — Gardner, Linn, Burkhart & Flory, LLP

(57) ABSTRACT

An apparatus for treating waste water including a tank having at least one waste water inlet for passing waste water into an inlet region of the tank, at least one waste water outlet for draining waste water from an outlet region of the tank, at least one first baffle between said inlet region and a settlement region of the tank, wherein contaminants having a specific gravity less than one are able to settle out from the waste water for subsequent removal, at least one second baffle between the settlement region and the outlet region of the tank. A recirculation system is adapted to recirculate waste water from the outlet region to the inlet region of the tank. The recirculation system includes a water inlet arranged in the outlet region of the tank, at least one water outlet arranged in the inlet region of the tank, and a pump for pumping water from said water inlet to the water outlet. At least one water outlet of the recirculation system is arranged adjacent the surface of the waste water in the tank in use to deliver water in a stream parallel to the water surface.

15 Claims, 11 Drawing Sheets

(51) Int. Cl.
   *B01D 21/00* (2006.01)
   *C02F 1/40* (2006.01)
   *B01D 21/24* (2006.01)
   *E03F 5/16* (2006.01)
   *B01D 17/02* (2006.01)

(56) References Cited

U.S. PATENT DOCUMENTS

| | | | | |
|---|---|---|---|---|
| 3,219,189 | A * | 11/1965 | Moore | 210/540 |
| 4,422,931 | A * | 12/1983 | Wolde-Michael | 210/532.1 |
| 4,681,680 | A * | 7/1987 | Delons et al. | 210/242.3 |
| 5,100,545 | A * | 3/1992 | Brooks | 210/540 |
| 5,122,280 | A | 6/1992 | Russell et al. | |
| 5,360,555 | A * | 11/1994 | Batten | 210/521 |
| 5,676,827 | A * | 10/1997 | Bruke | 210/523 |
| 5,738,782 | A * | 4/1998 | Schafer et al. | 210/521 |
| 7,459,090 | B1 * | 12/2008 | Collings | 210/521 |
| 2007/0045182 | A1 | 3/2007 | Chapin | |
| 2008/0217257 | A1 * | 9/2008 | Pank | 210/747 |
| 2010/0213119 | A1 * | 8/2010 | Generes et al. | 210/521 |

* cited by examiner

APPARATUS FOR TREATING WASTE WATER

CROSS REFERENCE TO RELATED APPLICATION

The present application claims the priority benefits of International Patent Application No. PCT/EP2012/071357, filed on Oct. 29, 2012, which is hereby incorporated herein by reference in its entirety.

BACKGROUND OF THE INVENTION

This invention relates to an apparatus for treating waste water and in particular to an apparatus for removing fats, oils and grease (hereinafter referred to as FOG) from waste water downstream of a washing facility, such as a sink in a commercial kitchen.

Typically, waste water drained from a sink in a commercial kitchen or catering facility contains grease in an emulsified state, as well as grease laden solids in suspension, typically in the form of foods wastes. Such contaminants can cause blockages in drainage systems and/or fouling of filtration systems or pumps within water treatment plants downstream of the drainage system.

Effluent from FOG contamination points in commercial kitchens typically originates from steam combination ovens, convection rotisserie ovens, pot sinks, pre-rinse sinks, dishwashers, canopies, and the like. They have in common the use and application of hot water ranging in temperature from 40° C. to 85° C. for the purposes of dealing with FOG contamination, where FOG is washed away in the waste water stream from such devices.

For these reasons, depending on the country, it is often compulsory for commercial kitchen operations to fit some kind of interceptor device to collect the FOG before it enters the sewer, typically referred to as a grease trap. Additionally, where FOG is a concern in the local wastewater collection system, inspection programs have been set up to ensure that these grease traps and/or interceptors are being maintained on a routine basis.

Known grease traps range in complexity from simple settling tanks, known as "passive" grease traps, that require periodic manual grease removal, to rather complex structural arrangements that provide for automatic skimming and collection of skimmed fats, oils and grease into external containers positioned adjacent the trap assembly, commonly referred to as "automated" grease traps.

Passive grease traps are, in essence, simply a settling tank having a wastewater inlet at one end and an outlet at an opposite end for connection to a drain. Often baffle plates are arranged within the tank to interrupt direct flow-through of wastewater between the inlet and the outlet. Periodically, an employee must manually skim the FOG that has accumulated at the surface of the wastewater. This is an extremely unpleasant and time-consuming task.

Automated grease traps include automatic skimmer arrangements, typically utilizing a rotating skimmer device, in the form of a disc, drum, endless belt or tube, mounted above the tank and connected to a drive arrangement to move the skimming device into and out of the waste water within the tank of the grease trap. The skimming device collects FOG from the surface of the water in the tank as it moves out of the water and is subsequently cleaned by means providing a scraping or squeezing action on the skimming device, such as wiper blades, arranged to direct the collected FOG into a collection device before the skimming device passes back into the water. The collection device is typically a separate container or reservoir located on one side of the tank.

Known grease traps require a regular maintenance program to be carried out to pump out such traps and refill with clean water. The European Standard EN 1825 calls for grease traps to be pumped monthly and preferentially fortnightly. In so far as grease traps contain some if not all of the entrained FOG and food wastes, these separate, with FOG having a specific gravity of less than 1 rising to the surface and food waste having a specific gravity greater than 1 sinking to the bottom.

Saturated fats, and animal fats in particular, are viscous above 40° C. but may be prone to solidify below such temperature. They are emulsified in the hot water. Hot water is used to remove FOG and to leave crockery, cutlery and pots and pans free and clear of FOG. Most known automated grease traps are only effective when the temperature of the waste water in the grease trap is around 40° C. to ensure that the FOG, in particular the more waxy components thereof, remain in viscous form and do not form a solid crust on top of the waste water. Therefore, known automated grease traps typically incorporate electrical heating elements within the grease trap. Such heating elements consume considerable electrical power and can cause a fire risk if overheating occurs or if the heating elements become exposed to the air.

Furthermore, at such temperatures the mesophilic range of aerobic bacteria quickly consume the available oxygen dissolved in the waste water as they seek to metabolize the organic matter. Conditions turn anaerobic and foul smells occur. The malodour issues associated with grease traps is evident whether you walk along a street in a tourist area with FSEs in abundance on a nice summer's night and smell the malodours wafting up from the sewers or open a conventional grease trap to be assaulted by noxious odours.

A further issue is that grease traps tend not to be regularly maintained, thus further contributing to the inefficiency of grease traps. The evidence in support of such a statement is the raft of statistics available from the drainage network companies as to the number of blockages attributable to FOG and to the service providers who clear drain blockages. The number of blockages and pollution incidents relating to fat, oil and grease are also increasing. There are approximately 200,000 sewer blockages throughout the UK every year of which up to 75% are caused by FOG. Clearing these blockages costs millions of pounds a year. Businesses also risk blocking their own drainage systems, which results in extra costs being incurred in clean-up efforts. These fat blockages can result in sewer flooding, odour problems and the risk of rat infestations, both near and beyond the affected premises. In fact, every outlet disposing of fat, oil and grease into sinks and drains is at risk of experiencing damaging and costly drainage problems. In the United States, each year sewers back up annually an estimated 400,000 times, and municipal sewer overflows on 40,000 occasions. The EPA has determined that sewer pipe blockages are the leading cause of sewer overflows, and grease is the primary cause of sewer blockages. Even if accumulated FOG does not escalate into blockages and sanitary sewer overflows, it can disrupt wastewater utility operations and increase operations and maintenance requirements.

SUMMARY OF THE INVENTION

According to a first aspect of the present invention, an apparatus for treating waste water includes a tank having at least one waste water inlet for passing waste water into an inlet region of the tank, at least one waste water outlet for draining waste water from an outlet region of the tank, at least one first baffle between the inlet region and a settlement region of the tank, wherein contaminants having a specific gravity less than one are able to settle out from the waste water for subsequent removal, and at least one second baffle between the settlement region and the outlet region of the tank. The apparatus further includes a recirculation system that is adapted to recirculate waste water from the outlet region to the inlet region of the tank. The recirculation system includes a water inlet arranged in the outlet region of the tank, at least one water outlet arranged in the inlet region of the tank, and a pump for pumping water from the water inlet to the water outlet. At least one water outlet of the recirculation system is arranged adjacent the surface of the waste water in the tank in use to deliver water in a stream parallel to the water surface.

According to a further aspect of the present invention, a method of treating waste water includes passing waste water into an inlet region of a tank, draining waste water from an outlet region of the tank, at least one first baffle being provided between the inlet region and a settlement region of the tank, wherein contaminants having a specific gravity less than one are able to settle out from the waste water for subsequent removal, and at least one second baffle being provided between the settlement region and the outlet region of the tank. The method further includes passing water from the outlet region to the inlet region of the tank. The water from the outlet region is delivered into the inlet region adjacent the surface of the water in the inlet region of the tank.

In a further aspect of the present invention, a flow control device includes a hollow body having an inlet passage extending tangentially into a spirally extending passage opening into a central outlet passage extending perpendicularly from the spirally extending passage. The cross sectional area of the inlet passage, spirally extending passage, and outlet passage may remain substantially constant throughout such that the device does not contain any substantial restrictions that might lead to the formation of blockages.

BRIEF DESCRIPTION OF THE DRAWINGS

Embodiments of the present invention will now be described, by way of example only, with reference to the accompanying drawings, in which.

DESCRIPTION OF THE PREFERRED EMBODIMENT

Figure 1:
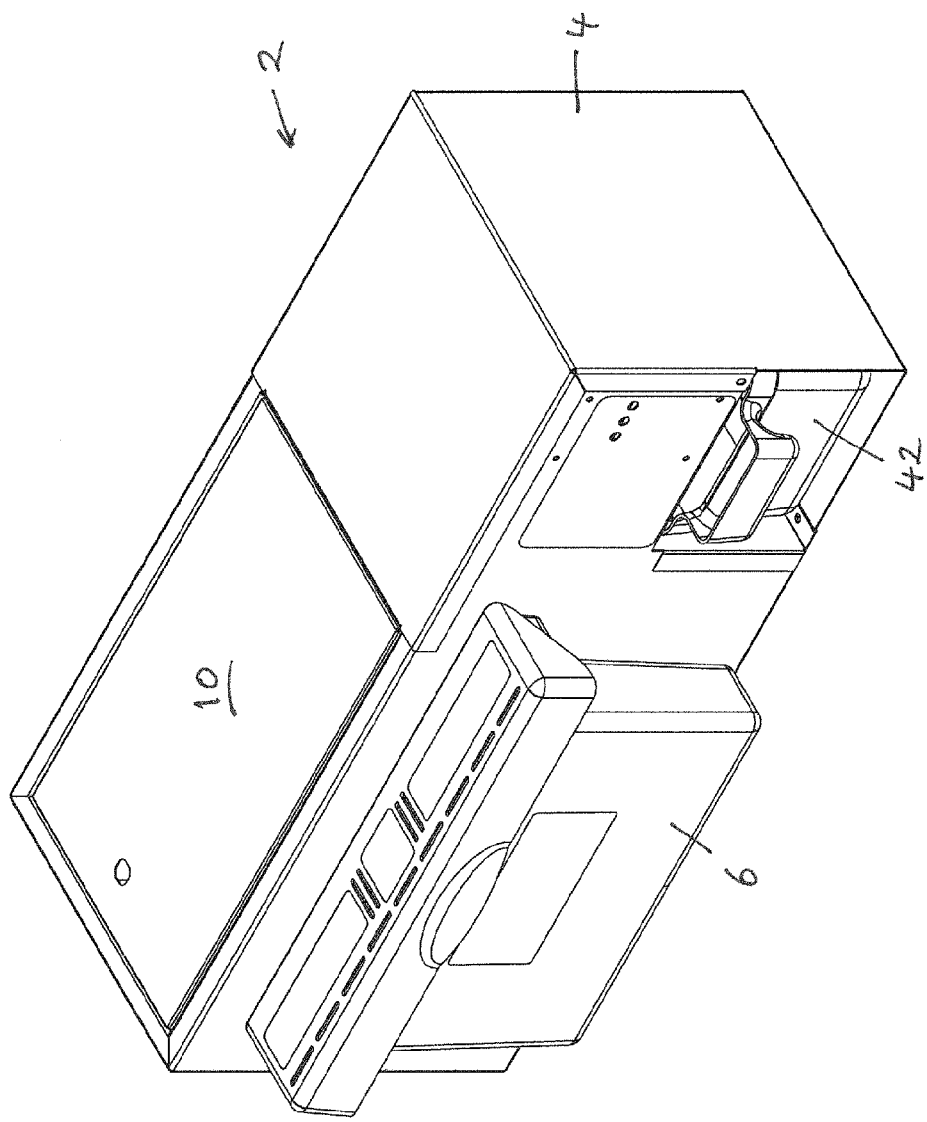
FIG. 1 is a perspective view of a grease trap in accordance with an embodiment of the present invention.

As illustrated in the drawings, a grease trap 2 includes a substantially rectangular housing 4 having a FOG collection tank 6 mounted on one side thereof. A rectangular open topped waste water collection tank 8 is mounted within the housing and is covered by an openable lid 10.

Figure 2:
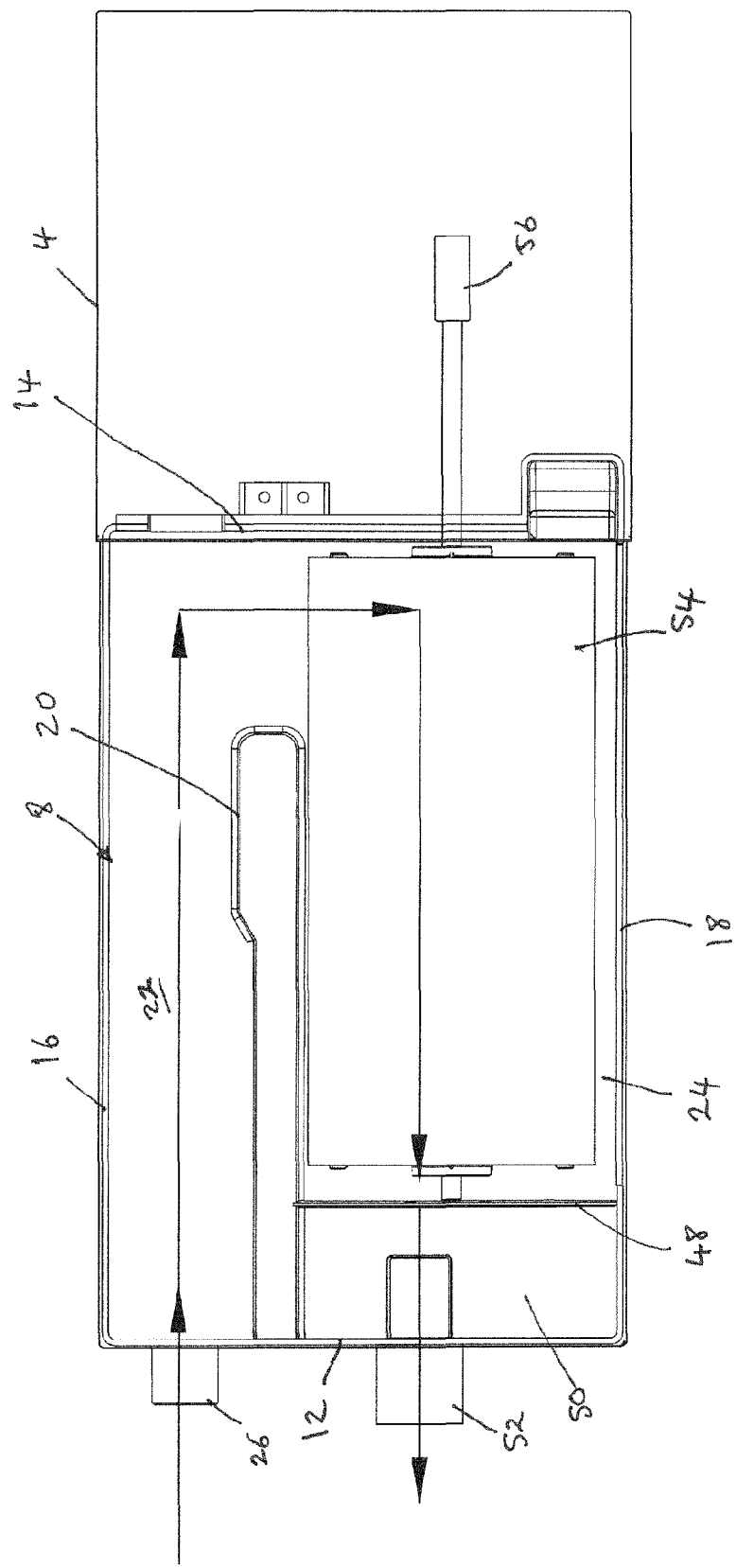
FIG. 2 is a plan view of the grease trap of FIG. 1 with a number of components omitted for clarity.

The tank 8 includes first and second oppositely disposed end walls 12,14 spaced apart by first and second oppositely disposed side walls 16,18. As best shown in FIG. 2, a longitudinal baffle or dividing wall 20 extends inwardly from said first end wall 12 towards said second end wall 14, parallel to said first and second side walls 16,18, said dividing wall 20 terminating adjacent said second end wall 14. The dividing wall 20 divides the interior of the tank into an inlet region 22 and a settlement region 24. The dividing wall 20 is positioned adjacent the first side wall 16 of the tank such that the inlet region 22 of the tank 8 is narrower than the settlement region 24.

The dividing wall 20 defines a flow path for the waste water through the grease trap 2 and effectively doubles the traverse length of the waste water through the tank 8, maximizing the effectiveness of the grease trap 2 within the space confines that are typically present in or around regions of waste water discharge, for example, underneath a sink in a commercial kitchen. The change of direction forced upon the waste water as it passes through the tank 8 also slows the flow of waste water, encouraging the separation of the FOG and water in the settlement region 24 of the tank 8.

Figure 4:
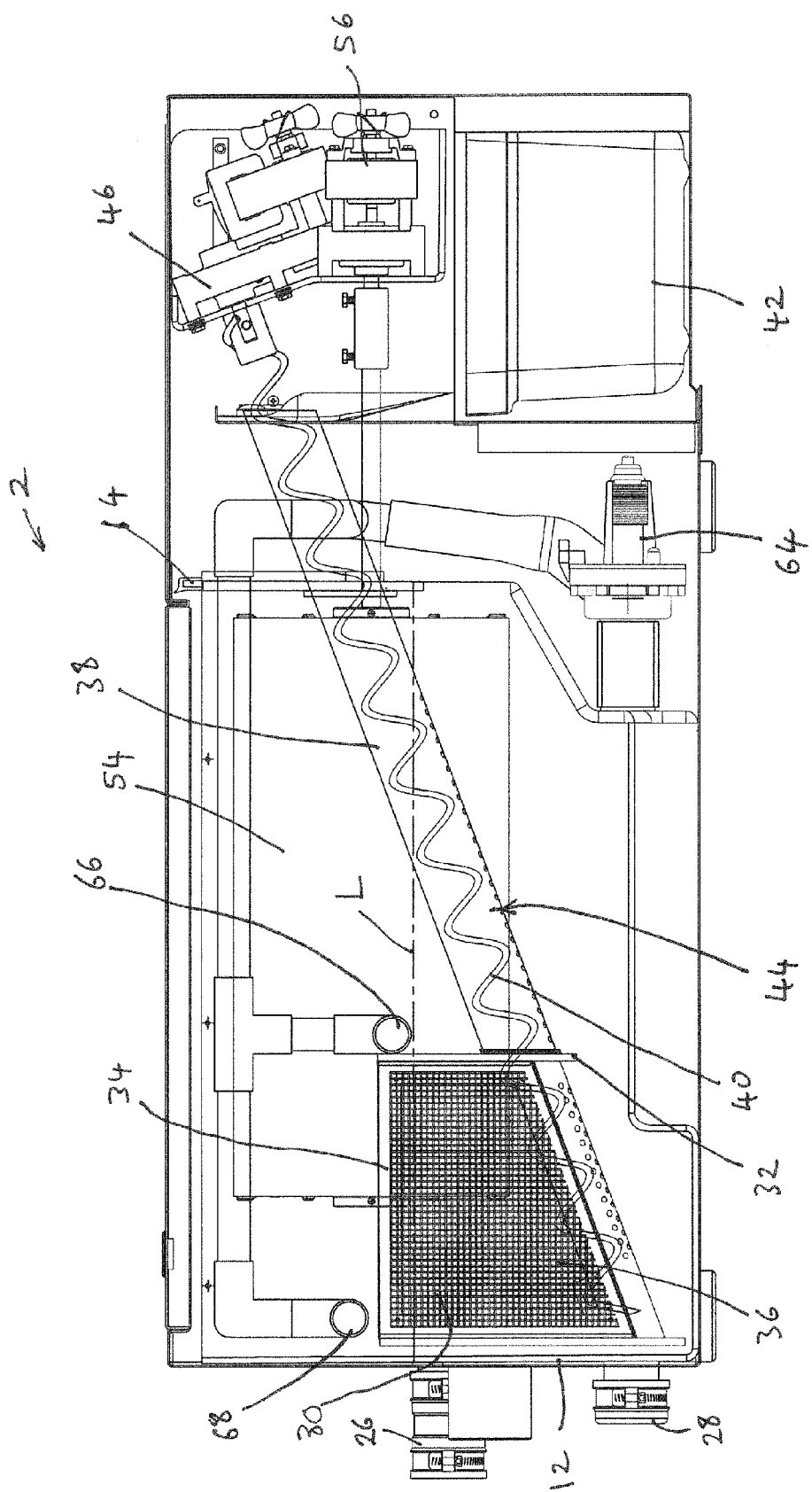
FIG. 4 is a longitudinal sectional view on line A-A of FIG. 3.

As best shown in FIG. 4, a pair of vertically spaced inlet pipes 26,28 are provided in the first end wall 12 to one side region thereof for delivering contaminated waste water into said inlet region 22 of the tank 8. A perforated strainer plate 30 is provided in the inlet region 22 of the tank 8 adjacent the inlet pipes 26,28 between the first end wall 12 of the tank 8 and a transverse inlet baffle 32, said strainer plate 30 delimiting a solids containment region 36 between said inlet baffle 32 and first end wall 12, whereby contaminated water enters the solids containment region 26 via the inlet pipes 26,28. The upper wall portion 34 of the strainer plate 30 is arranged to lie substantially level with the normal level L of waste water in the tank 8, when the grease trap is in use.

Figure 3:
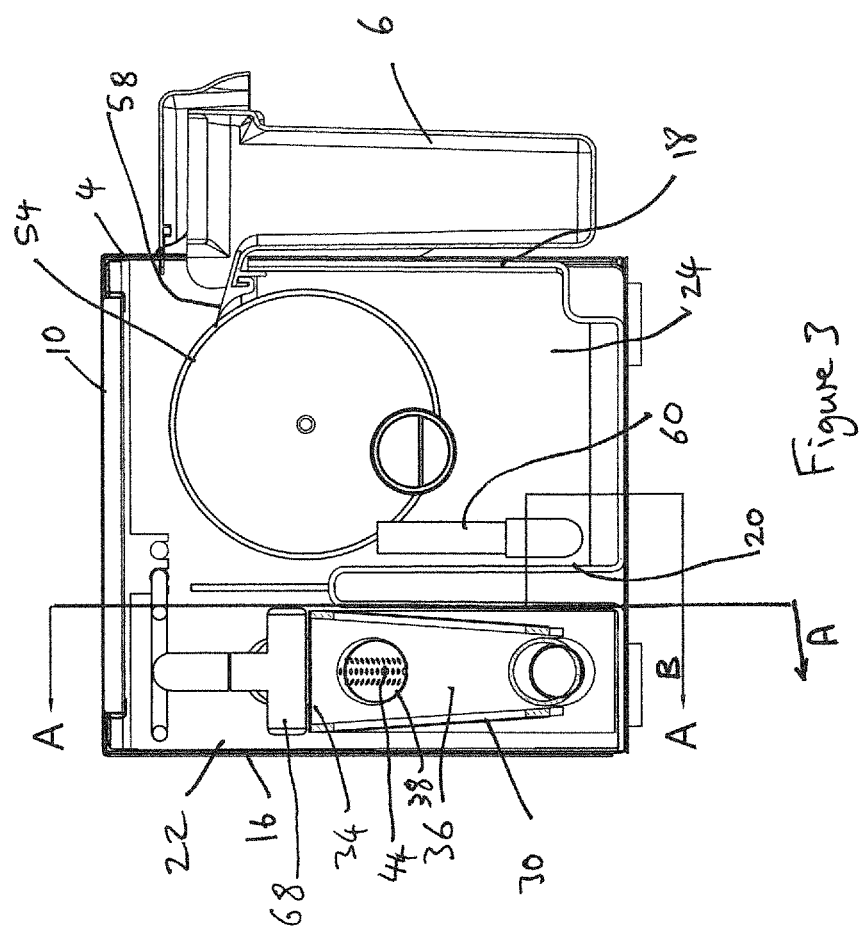
FIG. 3 is a transverse sectional view of the grease trap of FIG. 1.

As illustrated in FIG. 3, an upwardly sloping tubular sieve pipe 38 is provided in the inlet region 22 of the tank 8, extending upwardly from said solids containment region 36, through the inlet baffle 32 towards the second end wall 14, the upper end of the tubular sieve pipe 38 extending through the second end wall 14 of the tank 8. An auger or screw conveyor 40 is provided within the tubular sieve pipe 38 for conveying solids up the tubular sieve pipe 38 and into a solids collection tank 42 mounted within the housing 4 beneath an upper end of the sieve pipe 38. The lower side of the tubular sieve pipe 38 is provided within perforations 44 through which waste water and FOG may pass. Solids are dewatered as they are conveyed up the sieve pipe 38, waste water contaminated with FOG passing through the perforations 44 and into the inlet region 22 of the tank 8.

A motor 46 is mounted at an upper end of the tubular sieve pipe 38 for rotating the screw conveyor 40 such that solids material is conveyed from the solids containment region 36 to be delivered into the solids collection tank 42 from the upper end of the tubular sieve pipe 38, while water is passed into the inlet region 22 of the tank 8 through the perforations 44 in the tubular sieve pipe 38.

The strainer plate 30 engages the sieve pipe such that a lower end of the sieve pipe 38 defines a lower wall of the solids containment region 36. The inlet baffle 32 terminates level with the bottom of the sieve pipe 38, above the bottom of the tank, as shown in FIG. 4.

As illustrated in FIG. 2, an outlet baffle 48 extends between said second side wall 18 and the dividing wall 20, adjacent the first end wall 12, to define an outlet region 50, the lower end of the outlet baffle 48 terminating above the bottom of the tank 8 to define a flow path between the settlement region 24 and the outlet region 50 of the tank 8 in a lower region of the tank 8, such that waste water can pass from the tank 8 to the outlet region 50 while FOG, having a specific gravity less than one, is retained in an upper portion of the settlement region 24 of the tank 8. An outlet pipe 52 is provided in the first end wall 12 to drain waste water from the outlet region 50 of the tank 8.

A skimming device is mounted in the settlement region of the tank. The skimming device comprises an elongate drum 54 having a surface coated with or formed from a hydrophobic and oleophilic material, the drum 54 being mounted in the settlement region 24 of the tank 8 to be partially submerged in waste water held in the tank 8 when in use, the drum 54 being rotatable, under the action of a motor 56, to rotate about an axis extending substantially parallel to the first and second sides 16,18 of the tank 8. The drum 54 is typically rotated by the motor 56 at a speed of around 1 to 2 revolutions per minute. Preferably, the motor 56 is controlled to rotate the drum 54 at 1.3 rpm.

The FOG collection tank 6 includes a scraper or wiper blade 58 arranged to engage the surface of the drum 54 to scrape FOG from the surface thereof and deliver the FOG into the collection tank 6. The scraper 58 preferably comprises a silicone wiper bade having anti-friction properties to prevent static build-up.

As shown in FIG. 3, the wiper blade 58 is mounted on an extension of one side of the collection tank 6 such that the wiper blade 58 is brought into contact with the drum 54 as the FOG collection tank 6 is mounted onto the side of the housing 4. When the FOG collection tank 58 is removed to permit emptying, the wiper blade 58 can be cleaned at the same time.

Figure 5:
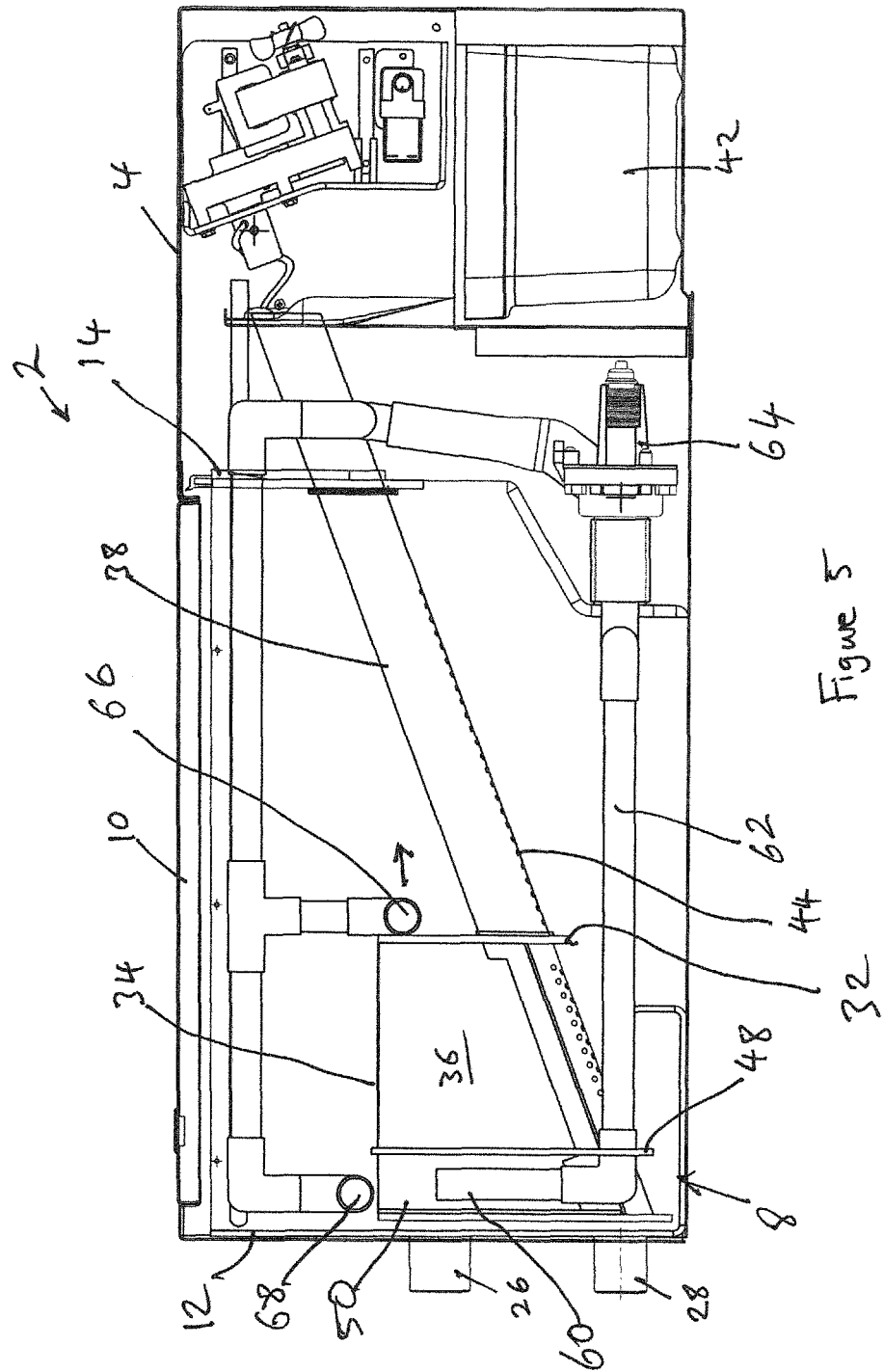
FIG. 5 is a longitudinal sectional view of line A-B of FIG. 3.

A best illustrated in FIG. 5, the grease trap 2 is provided with a recirculation system, whereby waste water is re-circulated from the outlet region 50 of the tank 8 into the inlet region 22 of the tank 8 to enhance the efficiency of the grease trap by dynamically driving FOG and like contaminants from the inlet region 22 towards the settlement region 24 and the skimming drum 54, as well as backwashing the upper wall portion 34 of the strainer plate 30, aerating the waste water within the tank and removing any remaining FOG from the outlet region 50, as will be described below in more detail.

The recirculation system comprises a grey water inlet pipe 60 located in the outlet region 50 of the tank 8, said inlet pipe 60 extending vertically upwardly within the outlet region 50 and terminating just below the normal water level of the waste water in the tank when the grease trap is in use. The inlet pipe 60 communicates with a recirculation pump 62 via a recirculation pipe 64 whereby the grey water drawn from the outlet region 50 is passed to the inlet region 22 of the tank via a first recirculation outlet 66 positioned immediately downstream of the inlet baffle 32.

The first recirculation outlet comprises a tubular member having a row of outlet apertures or a slotted outlet extending transverse to the inlet baffle 32 to create a stream of recirculated grey water at or just below the surface of the waste water in the tank 8, in the direction of the second end wall 14 of the tank 8.

A second recirculation outlet 68 is provided adjacent the first end wall 12 of the tank 8 to directing a flow of grey water over the upper wall portion 34 of the strainer plate 30 to backwash the strainer plate 30.

A water level sensor, such as a pressure sensor, may be provided for sensing the water level in the tank 8. A drainage pump may be provided for draining water from the tank 8, in particular from the outlet region 50 thereof, should the water level exceed a predetermined maximum level.

A programmable controller is provided for controlling the operation of the skimming drum, screw conveyor and the drainage and recirculation pumps. The controller may include a timer to permit the skimming drum, screw conveyor and/or recirculation and/or drainage pumps to be periodically operated at pre-programmed times and for predetermined periods. The controller may be programmed such that the screw conveyor is operated to remove entrained solids in a more or less continuous fashion and to control the operation of the skimming drum to do the same in removing FOG, albeit there are program variations calling for periodically operating the skimming drum, for example, "On" typically for 5 minutes and then "Off" for 5 minutes, to reflect the stop go pattern that is found in many kitchens. FOG are removed "proactively" and in real time. The grease trap is NOT a passive grease trap albeit it is designed to retain peak periods of FOG deriving from grease laden effluent.

Known grease traps are typically classified as passive in nature and operation. Mechanical grease traps (for the majority of time) act as small passive grease traps before (typically) a heating element is activated for the purposes of heating the retained effluent and FOG. These mechanical grease traps suffer from sizing limitations and minimal FOG retention capability. They are also prone to "cooking" the FOG and causing smoke to be emitted resulting in a number of reported incidents of smoke detectors being activated causing sprinkler systems to be activated and resultant water damage to commercial premises. Typically, they are activated to remove viscous FOG for periods of between 10 minutes to 1 hour per day.

By contrast, the grease trap 2 of the present invention may be programmed to operate in default mode for 19 hours per day between the hours of 7.30 am and 2.30 am the following morning or can be programmed to operate 24 hours a day, seven days a week, or any other pre-programmed timing, as required.

By eliminating contamination at source, a grease trap in accordance with the present invention can protect the drainage and water course systems whilst harvesting a source of renewable energy, thus contributing to a sustainable environment. It is designed to prevent blockages of FOG origin in drains and protect pumping stations whilst significantly reducing the loading on waste water treatment plants. Where sampling of effluent is practiced, significant effluent treatment charges can be applied as a result of high BOD, SS and FOG levels detected. A grease trap in accordance with the present invention can achieve significant reductions in the BOD; COD; FOG and SS loading levels of effluent being discharged from commercial food service premises.

The recurring need to pump known grease traps and refill with clean water is eliminated, as is the costly use of biological agents, enzymes and chemicals.

The use of recirculated grey water recognizes that water is a scarce resource and indeed in the Middle East potable water is more expensive than oil. Using recirculated grey water to carry out internal cleaning thereby conserves a valuable water resource. Water usage and associated costs are reduced because the need to pump out and refill with clean water is eliminated.

The grease trap in accordance with the present invention can take advantage of waste thermal energy present in effluent being discharged from commercial kitchens to remove emulsified FOG, particularly saturated animal fats before they solidify. No heating elements are used thereby reducing energy and operational costs and CO2 related emissions. This has been quantified as approximating to a saving of up to 5 tons of CO2 related emissions in a year in comparison to passive traps and mechanical grease traps which utilize heating elements and which traps require to be pumped on a regular basis involving the use of road tankers.

The use of a combination of retaining baffles, including a magnetic baffle, reverse flow configuration and the differing specific gravities of water and FOG which are in turn complemented by thermal layers within the effluent, in conjunction with the properties of the unique oleophilic and hydrophobic FOG removal means, provide an advantageous small compact unit that is easily installed in commercial kitchens where space is at a premium.

In use, effluent from pre-rinse, power soak, pot, and sundry sinks, Ovens, Canopies, Chicken ovens, Wok Cooking Stations, Dishwashers and other appliances, enters the solids containment region 36 of the grease trap. Food solids are automatically screened and dewatered by passing the solids up the inclined sieve pipe via the screw conveyor, the solids being deposited into the external solids collection container 42.

As illustrated in the embodiments shown in FIGS. 6 to 10, a strainer or pre-filter may be used to remove larger solids waste (such as food, strings, stalks and other debris) upstream of the tank 8.

Figure 6:
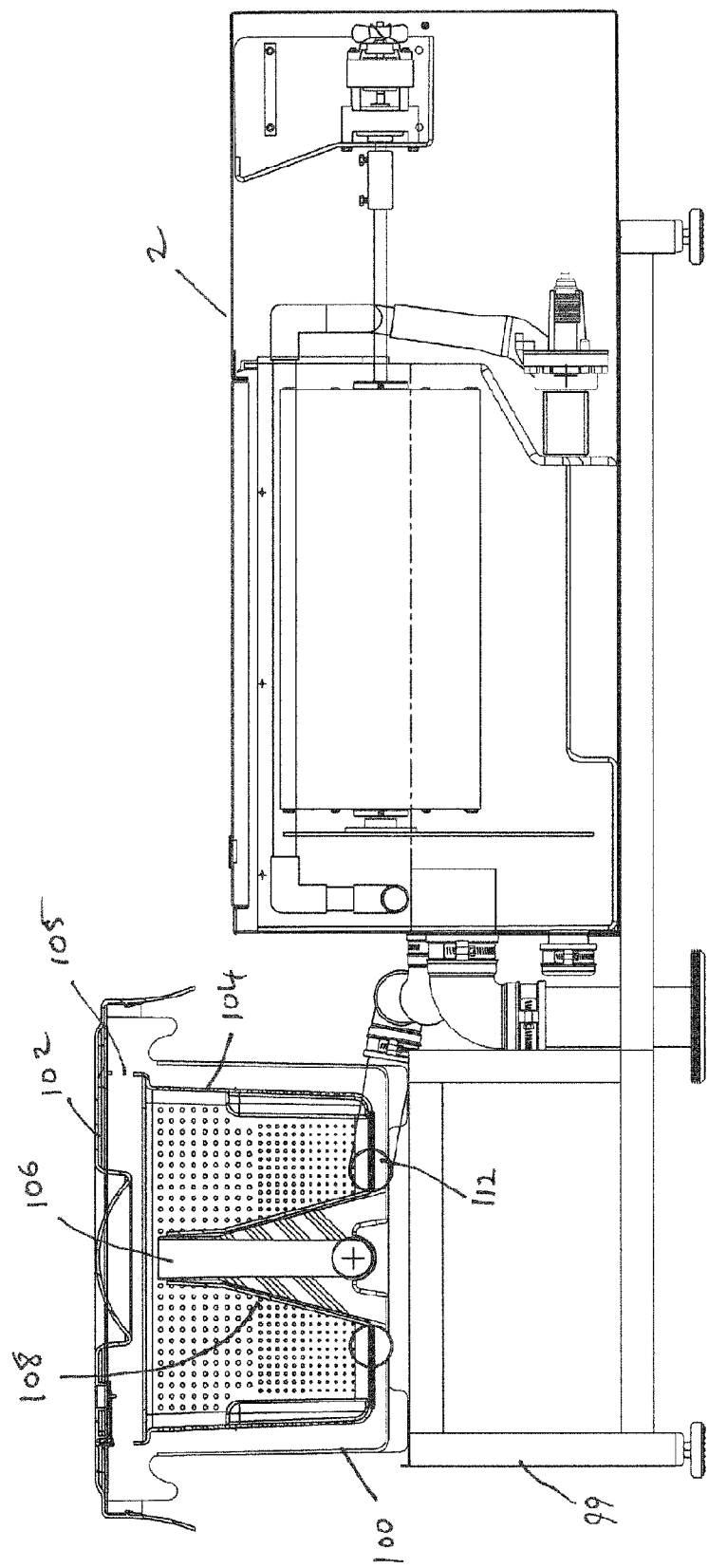
FIG. 6 is a longitudinal sectional view of a grease trap in accordance with a further embodiment of the present invention provided with a pre-filter for collecting solids.
Figure 7:
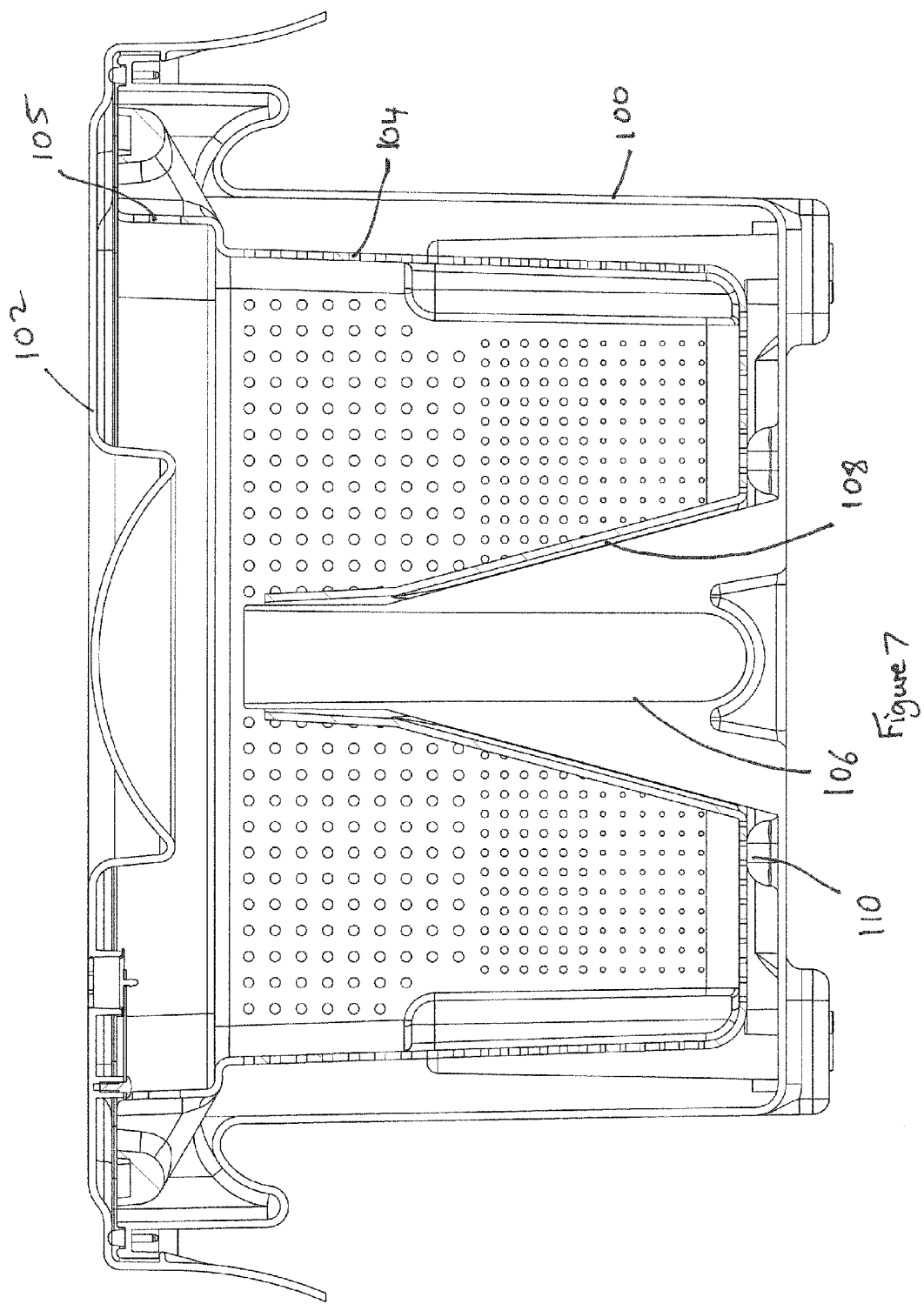
FIG. 7 is a detailed sectional view of the pre-filter of the grease trap of FIG. 6.

In the embodiment shown in FIGS. 6 and 7, a pre-filter unit is mounted upstream of the grease trap 2 such that wastewater passes through the pre-filter before entering the grease trap. The pre-filter unit comprises a tank 100 having a lid 102, the tank being mounted on a support frame 99 to one side of the grease trap such that the bottom of the tank 100 is above the normal level of water within the grease trap 2. This ensures that any solid material collected in the tank 100 of the pre-filter unit is not immersed in stale wastewater, which otherwise might lead to the rotting of organic matter in the pre-filter and the formation of anaerobic conditions causing noxious odours.

A strainer basket 104 is located within the tank 100 for separating and collecting solid materials from the waste water, the strainer basket having a plurality of apertures formed therein to allow water and emulsified FOG to drain out of the strainer basket to be passed to the grease trap while retaining solids are retained within the strainer basket 104. The apertures may have a diameter of around 4 mm to allow water to freely pass through the walls of the basket while retaining larger solid waste within the basket.

A gap 105 is provided at an upper end of the sides of the strainer basket 104 between the upper edges of the walls of the strainer basket and the lid 102 to provide an overflow should the apertures in the strainer basket 104 become clogged.

As can be seen from FIG. 7, waste water, and any solids entrained therein, passes into the pre-filter unit through an inlet pipe 106 leading from a lower side of the tank 100 and terminating in a raised central outlet. The strainer basket 104 has a raised central inverted cone-shaped region 108 adapted to sit over the vertical section of the inlet pipe 106 so that waste water flows down the sides of the raised central region 108 of the strainer basket 106. Raised formations 110 are formed on the base of the tank 100 for supporting the strainer basket 104 while defining a gap beneath the strainer basket 104 to allow waste water to pass through the apertures of the strainer basket 104. At least one outlet 112 is provided in a lower region of the tank 100 to drain water out of the tank 100 and into the grease trap 2.

More than one outlet may be provided to allow flexibility in the connection of the pre-filter unit to the grease trap, unused outlets being sealed by suitable closure means or plugs.

Figure 8:
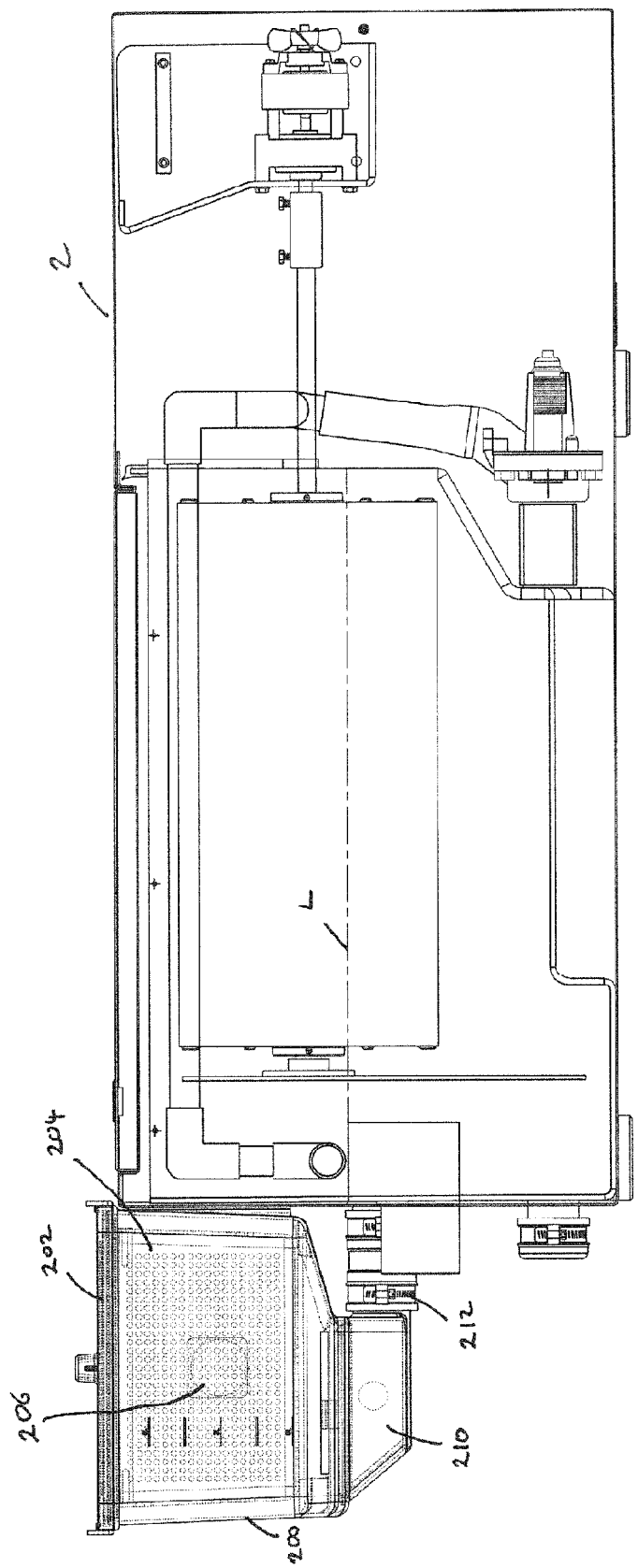
FIG. 8 is a longitudinal sectional view of a grease trap in accordance with a further embodiment of the present invention.
Figure 9:
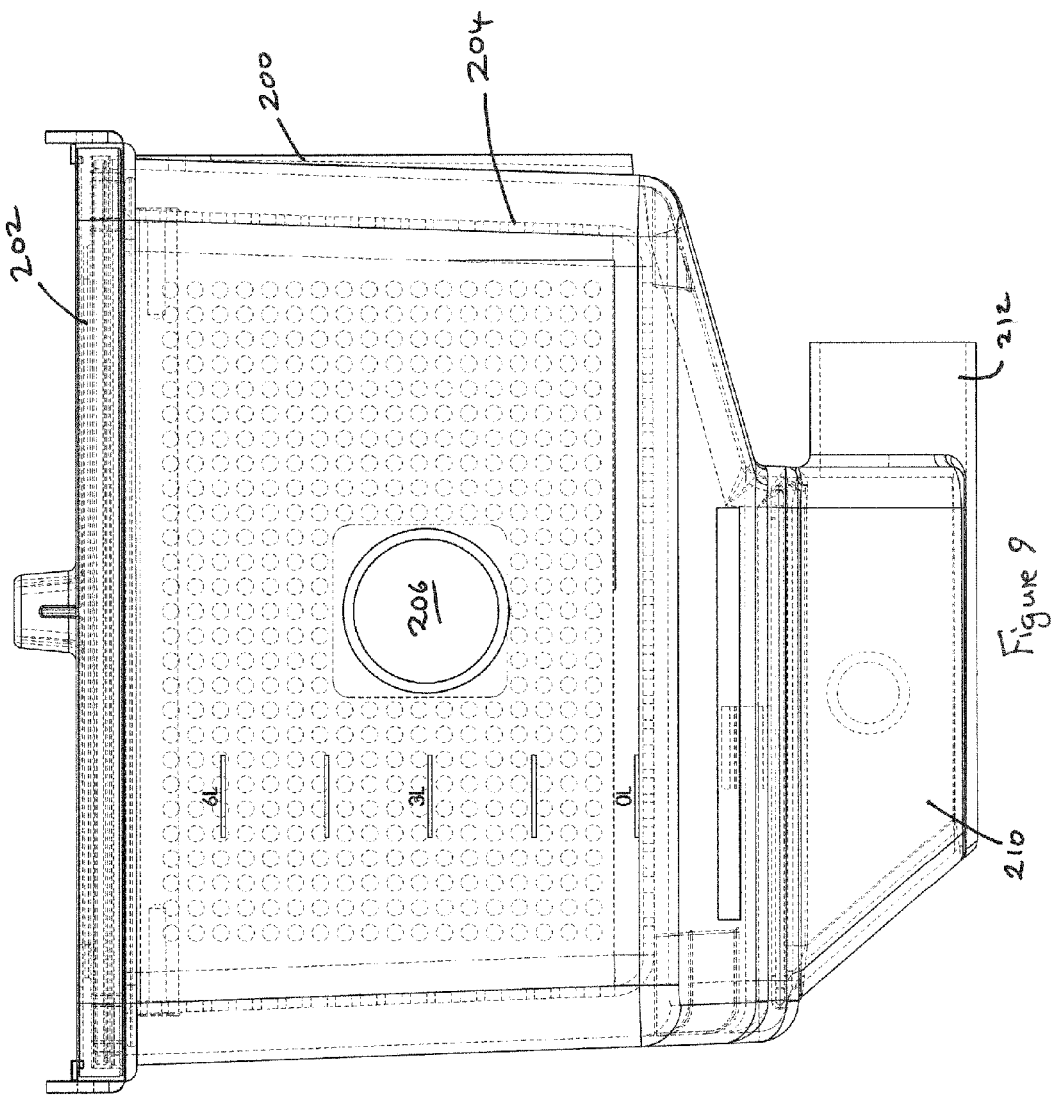
FIG. 9 is a side view of the pre-filter of the grease trap of FIG. 8.
Figure 10:
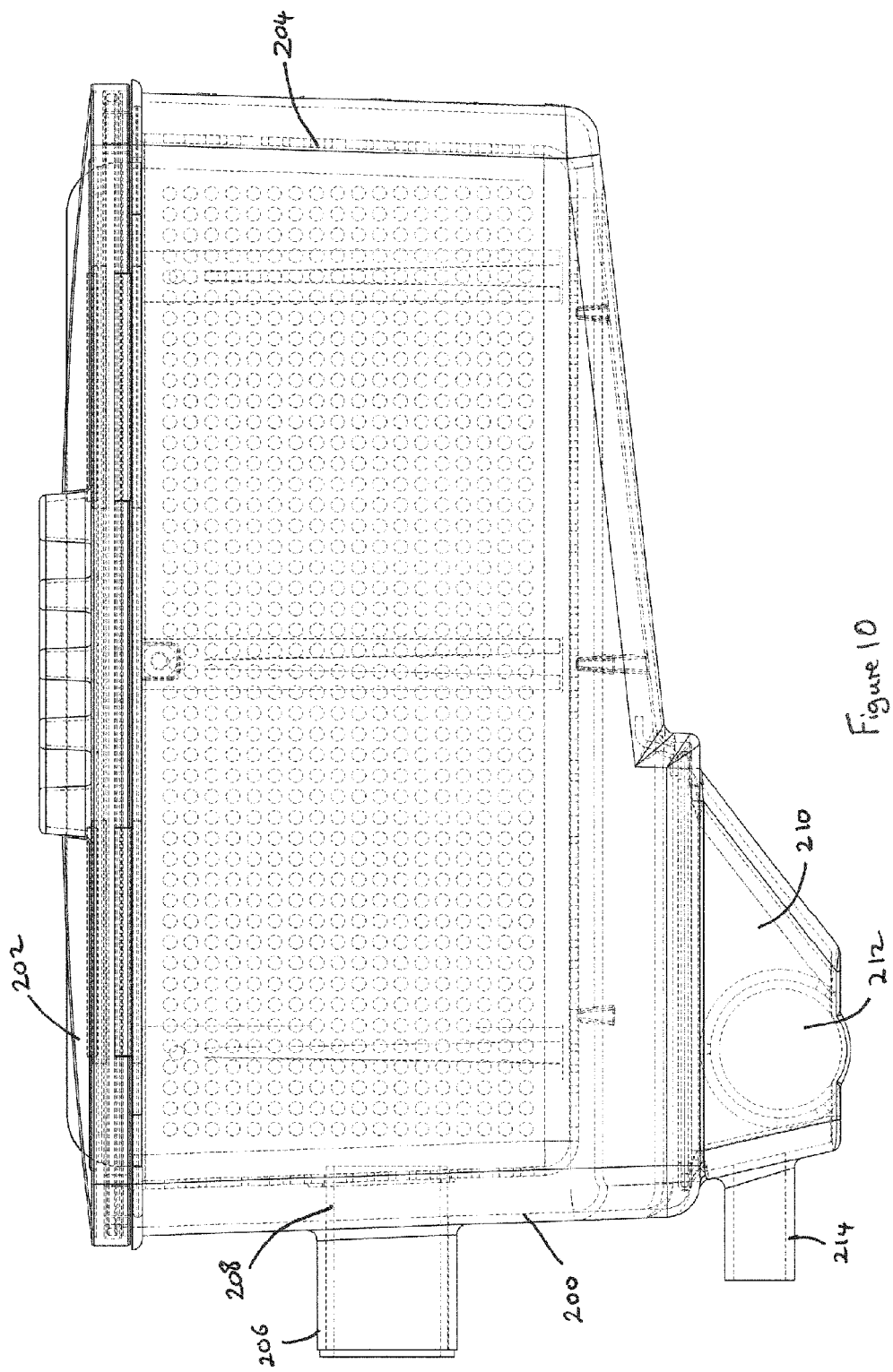
FIG. 10 is an end view of the pre-filter of the grease trap of FIG. 8.

An alternative embodiment is illustrated in FIGS. 8 to 10, wherein the tank 200 of the pre-filter unit is mounted on a side of the grease trap 2 adjacent the inlet thereof. As with the embodiment shown in FIGS. 6 and 7, the tank 200 contains a strainer basket 204 and is provided with a lid 202. An inlet 206 is provided in an outer wall of the tank 200, the strainer basket 204 having an inlet pipe 208 adapted to fit into the inlet 206 of the tank 200 so that waste water and entrained solids can be passed into the strainer 204 basket via the inlet 206.

The tank 200 is provided with a sump region 210 having an outlet 212 adapted to be coupled to an inlet of the grease trap 2. The tank 200 is positioned on the side of the grease trap so that the bottom of the strainer basket 204 remains above the normal water level L in the grease trap 2 so that any solids collected in the strainer basket 204 of the pre-filter unit are held above the level of water in the system.

A further port 214 may be provided in the sump region 210 of the tank 200 for recirculating water to the inlet of the grease trap.

It is desirable to control the flow rate of waste water into the grease trap to ensure that the flow rate of waste water into the grease trap does not exceed the flow rate out of the grease trap, which might otherwise lead to the grease trap overflowing and/or passing untreated waste water into the drains. However, known flow limiting devices have the disadvantage of creating flow restrictions which may become blocked by solid waste.

Figure 12:
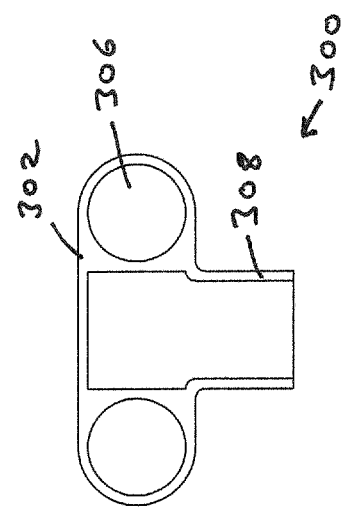
FIG. 12 is a longitudinal sectional view through the flow control device of FIG. 11.
Figure 11:
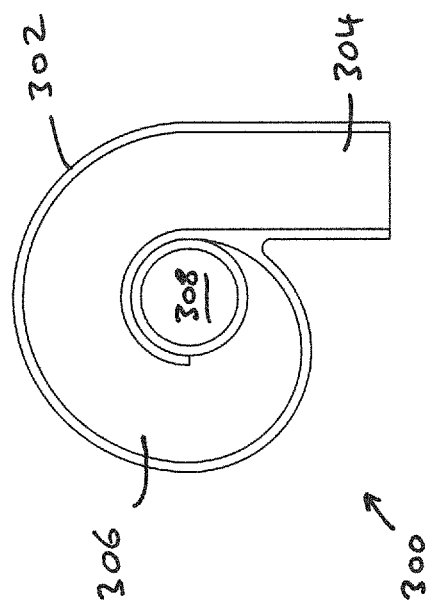
FIG. 11 is a transverse sectional view through a flow control device in accordance with an aspect of the present invention.

In a preferred embodiment of the present invention, the flow of waste water into the grease trap (or into the pre-filter upstream of the grease trap) is controlled by an improved flow control device 300, illustrated in FIGS. 11 and 12, comprising a hollow body 302 having an inlet passage 304 extending tangentially into a spirally extending passage 306 opening into a central outlet passage 308 extending perpendicularly from said spirally extending passage 306. The cross section of the flow passage through the hollow body 302 of the flow control device 300 remains substantially constant throughout the device 300. Therefore, the flow passage does not contain any restrictions that might lead to the formation of blockages.

In use, waste water flowing into the spirally extending passage 306 from the inlet passage 304 generates a vortex flow pattern within the outlet passage 308. This generates an air space within the centre of the outlet passage. This air space acts as a flow restriction, limiting the flow rate of water through the flow control device. Because the cross section of the flow passage through the flow control device remains substantially constant, the flow rate through the device 300 can be controlled without the risk of blockages.

The Water Environment Research Foundation found that a majority (90%) of the FOG deposits contained saturated fats. A high percentage of the recovered FOG deposits (85%) also had calcium present with values ranging from 1,200 to 25,000 ppm. References: Professors Ducoste & Keener, Et Al, 03-CTS-16T 2008. FOG Deposits are formed primarily by saponification and are nothing more than metal soaps.

Saponification, or soap formation, is caused by reacting fatty acids (animal and/or vegetable) with an alkali. It is suggested that drainage systems blocked as a primary result of FOG comprise mainly Saturated Fats with Dairy Wastes.

It is thus important to remove FOG including Saturated Fats and Dairy Wastes to minimize drainage problems attributable to FOG causes.

The grease trap 2 takes advantage of waste thermal energy present in the waste water effluent to remove emulsified animal fats and FOG before they solidify, using a combination of retaining baffles, reverse flow configuration and the differing specific gravities of water and FOG which are complemented by thermal layers within the effluent.

All of these factors, working in conjunction with the properties of the oleophilic (attracts FOG) and hydrophobic (repels water) skimming drum 54, ensures that the objective of protecting drainage systems is achieved. When the FOG collection tank 6 is attached to the housing 4 of the grease trap 2, the silicone rubber blade or scraper 58 makes contact with the slowly rotating drum 54 allowing the FOG to be removed externally for recycling and safe disposal.

The treated waste water effluent then flows under the outlet baffle 48, into the outlet region 50 of the tank 8 and out through the outlet pipe 52 to be delivered to a drain.

The use of recirculating grey effluent enhances the efficiency of the grease trap by (in addition to backwashing and maintaining the cleanliness of the strainer plate 30) dynamically driving FOG and like contaminants (e.g., dairy products) towards the FOG removal drum 54. This process is further complemented by means of the grey effluent intake pipe 60, the position of which, near the water surface, creates a whirlpool effect, providing a secondary means of recirculating and making available for removal, miniscule particles of FOG entrained in the effluent that may have passed through the co-operating baffles.

The grease trap reuses and recirculates grey water, agitating the waste water within the tank 8 with intermittent cleaning cycles, removing fine sedimentation and back washing the strainer plate 30, preventing foul smells.

The grease trap in accordance with the present invention removes staff requirements to access the internal of the grease trap and eliminates any recurring expense for licensed waste contractors to pump out and dispose of the grease trap contents.

Magnetic water "stabilizers" may be provided on the inlet supply water lines to counteract the formulation of scale caused by hard water in pipe work. This effect is well known but the reason why they work is not so well known. Magnetic water treatment units are also referred to as non-chemical water treatment systems or catalytic water treatment systems or algarids.

It is recognized that a combination of scale caused by hard water together with an accumulation of FOG can have a deleterious effect upon the sewage pipework downstream and the indigenous microbial communities by making the food source unavailable or restricting access to same.

By way of explanation, if we consider a cow and it's rumen (a biological reactor in which cellulose and other organic inputs are processed), with a view to increasing the quality of the milk obtained from the cow, we have to prevent the bacterial population in the rumen from getting at the feed supplements. This is achieved by encapsulating the supplements with calcium thereby making them unavailable to the ruminant bacteria, but as the supplements reach the cow's stomach, the acids therein breakdown the calcium thereby enabling the animal to digest the supplements so as to provide a higher quality milk product.

Water may be softened by passing effluent through a series of co-operating magnetic baffles within the tank 8, comprised of maintenance free wet type anisotropic barium ferrite magnets which are axially magnetized. The magnetic baffles may have three purposes. These are:

a) the electro-magnetic processing of waste water effluent to prevent scaling of sewage pipework by calcium and metal deposits which is a contributory factor to blockages recurring in sewage systems in areas where the water is hard or mineralized.

b) to contribute to the lathering effect of the wetting agents typically found in commercial surfactants and making them more readily available (soap lathers easily) in breaking down accumulations of FOG in the sewage system.

c) Passing indigenous bacteria (entrained in effluent) through the magnetic fields alters the cell walls permitting the absorption of mineral crystals. Filter life is also extended with co-operating magnetic water treatment, i.e., slime build-up is reduced. This is attributable to the consumption of polysaccharides by the magnetically affected bacteria. Accumulation of algae downstream is inhibited by virtue of the organic and inorganic matter having been bio-converted.

The invention is not limited to the embodiment(s) described herein but can be amended or modified without departing from the scope of the present invention.

The invention claimed is:

1. An apparatus for treating waste water, comprising:
a tank having at least one waste water inlet for passing waste water into an inlet region of the tank, at least one waste water outlet for draining waste water from an outlet region of the tank, at least one first baffle between said inlet region and a settlement region of the tank, said first baffle being longitudinally extending wherein contaminants having a specific gravity less than one are able to settle out from the waste water for subsequent removal, and at least one second baffle between said settlement region and said outlet region of the tank, said second baffle being an underflow baffle;
a recirculation system that is adapted to recirculate waste water from said outlet region to said inlet region of the tank, said recirculation system including a grey water inlet arranged in said outlet region of the tank, at least one other water outlet arranged in said inlet region of the tank, and a pump for pumping water from said grey water inlet to said other water outlet;
wherein at least one other water outlet of the recirculation system is arranged adjacent the surface of the waste water in the tank in use to deliver water in a stream parallel to the water surface wherein the grey water inlet is arranged to receive water from an upper region of the outlet region of the tank.

2. An apparatus as claimed in claim 1, wherein said water outlet is arranged to deliver water into said inlet region in a direction towards said settlement region to urge contaminants in the waste water towards said settlement region.

3. An apparatus as claimed in claim 1 wherein a solids removal system is provided in said inlet region of the tank.

4. An apparatus as claimed in claim 3, wherein said solids removal system comprises an elongate perforated sieve tube extending from said inlet region to a position outside of the tank, said sieve tube containing an auger or screw conveyor for conveying solids through the sieve tube to an external collection system while dewatering the solids via said perforations such that said water is passed into the tank through the perforated sieve tube.

5. An apparatus as claimed in claim 1, further comprising a FOG removal device for removing FOG from the surface of waste water in the settlement region of the tank.

6. An apparatus as claimed in claim 5, wherein said FOG removal device comprising an elongate drum arranged to rotate about a substantially horizontal axis, said drum being arranged, in use, to be partially immersed in waste water in the tank, a wiper or scraper being provided for removing FOG from the drum and delivering said FOG into a collection reservoir.

7. An apparatus as claimed in claim 1, wherein said tank comprises a substantially rectangular hollow body having first and second oppositely disposed end walls spaced apart by first and second oppositely disposed side walls, a longitudinal dividing wall extending from said first end wall towards said second wall, substantially parallel to said first and second side walls, said dividing wall terminating at a location spaced from said second wall, at least one waste water inlet being provided in said first end wall for delivering waste water into an inlet region of the tank on a first side of the dividing wall, at least one waste water outlet being provided in said first end wall for draining waste water from an outlet region of said tank on an second side of the dividing wall, opposite said first side, an inlet baffle extending between said dividing wall and said first side wall on said first side of the dividing wall, an outlet baffle extending between said dividing wall and said second side wall on said second side of the dividing wall, said inlet and outlet baffles being located so as to allow waste water to pass underneath them.

8. An apparatus as claimed in claim 7, wherein a FOG removal device is provided on said second side of the dividing wall between said outlet baffle and the second end wall of the tank for removing FOG from the surface of the waste water in the tank.

9. An apparatus as claimed in claim 8, wherein said FOG removal device comprising an elongate drum rotatably mounted in said tank for rotation about a substantially horizontal axis parallel to said dividing wall.

10. An apparatus as claimed in claim 7, wherein said recirculation system comprises an inlet terminating within an outlet region defined between said outlet baffle and said first end wall of the tank on said second side of the dividing wall for receiving water from said outlet region and at least one outlet provided on said first side of the dividing wall adjacent said inlet baffle for directing water in the direction of said second end wall of the tank.

11. An apparatus for treating waste water, comprising:
a tank having at least one waste water inlet for passing waste water into an inlet region of the tank, at least one waste water outlet for draining waste water from an outlet region of the tank, at least one first baffle between said inlet region and a settlement region of the tank, said first baffle being longitudinally extending wherein contaminants having a specific gravity less than one are able to settle out from the waste water for subsequent removal, and at least one second baffle between said settlement region and said outlet region of the tank, said second baffle being an underflow baffle;
a recirculation system that is adapted to recirculate waste water from said outlet region to said inlet region of the tank, said recirculation system including a grey water inlet arranged in said outlet region of the tank, at least one other water outlet arranged in said inlet region of the tank, and a pump for pumping water from said grey water inlet to said at least one other water outlet;
wherein at least one other water outlet of the recirculation system is arranged adjacent the surface of the waste water in the tank in use to deliver water in a stream parallel to the water surface, wherein said tank comprises a substantially rectangular hollow body having first and second oppositely disposed end walls spaced apart by first and second oppositely disposed side walls, a longitudinal dividing wall extending from said first end wall towards said second wall, substantially parallel to said first and second side walls, said dividing wall terminating at a location spaced from said second wall, at least one waste water inlet being provided in said first end wall for delivering waste water into an inlet region of the tank on a first side of the dividing wall, at least one waste water outlet being provided in said first end wall for draining waste water from an outlet region of said tank on a second side of the dividing wall, opposite said first side, on said second side of the dividing wall, said inlet and outlet battles being located so as to allow waste water to pass underneath them wherein said recirculation system comprises an inlet terminating within an outlet region defined between said outlet baffle and said first end wall of the tank on said second side of the dividing wall for receiving water from said outlet region and at least one outlet provided on said first side of the dividing wall adjacent said inlet baffle for directing water in the direction of said second end wall of the tank wherein said inlet is defined by an open end of a vertically arranged pipe located in said outlet region, said pipe terminating at a position arranged to be adjacent the surface of the water of the water in the outlet region of the tank, in use, to receive material from the surface of the water.

12. An apparatus as claimed in claim 11, wherein a strainer is provided between said first end wall and the inlet baffle of the tank, said recirculation system having a further outlet for delivering water from the outlet region of the tank onto said strainer means to backwash the strainer.

13. An apparatus as claimed in claim 12, wherein a perforated pipe extends upwardly from said inlet region adjacent said first end wall of the tank towards said second end wall, said perforated pipe terminating above a solids collection chamber, an auger or screw conveyor being provided within said perforated pipe for conveying solid material into said solids collection chamber, said solids being dewatered during passage through said perforated pipe, liquids passing from through the perforated pipe into the tank on said first side of the dividing wall.

14. A method of treating waste water, comprising:
passing waste water into an inlet region of a tank, draining waste water from an outlet region of the tank, at least one first baffle being provided between said inlet region and a settlement region of the tank, said first baffle being a longitudinally extending baffle wherein contaminants having a specific gravity less than one are able to settle out from the waste water for subsequent removal, at least one second baffle being provided between said settlement region and said outlet region of the tank, said second baffle comprising an underflow baffle; and
passing water from said outlet region to said inlet region of the tank, said water from the outlet region is delivered into said inlet region adjacent the surface of the water in the inlet region of the tank, wherein the water is removed from the outlet region adjacent the surface of the water to entrain material from the surface of said water.

15. A method as claimed in claim 14, wherein said water from the outlet region is delivered into said inlet region in a direction to entrain said waste water towards said settlement region.

* * * * *